United States Patent [19]
Asao

[11] Patent Number: 6,002,194
[45] Date of Patent: Dec. 14, 1999

[54] ROTOR FOR A DYNAMO-ELECTRIC MACHINE

[75] Inventor: Yoshihito Asao, Tokyo, Japan

[73] Assignee: Mitsubishi Denki Kabushiki Kaisha, Tokyo, Japan

[21] Appl. No.: 09/196,350

[22] Filed: Nov. 19, 1998

[30] Foreign Application Priority Data

Jun. 3, 1998 [JP] Japan .................................. 10-154903

[51] Int. Cl.⁶ ...................................................... H02K 1/22
[52] U.S. Cl. ............................ 310/269; 310/43; 310/181; 310/218
[58] Field of Search ............................. 310/43, 156, 180, 310/181, 257, 218, 261, 263; 29/596, 598

[56] References Cited

U.S. PATENT DOCUMENTS

| | | | |
|---|---|---|---|
| 5,483,116 | 1/1996 | Kusase et al. | 310/263 |
| 5,536,987 | 7/1996 | Hayashi et al. | 310/263 |
| 5,793,144 | 8/1998 | Kusase et al. | 310/263 |
| 5,892,313 | 4/1999 | Harris et al. | 310/263 |
| 5,907,209 | 5/1999 | Ishida . | |

FOREIGN PATENT DOCUMENTS 7-123664   5/1995   Japan .

*Primary Examiner*—Nestor Ramirez
*Assistant Examiner*—Tran Nguyen
*Attorney, Agent, or Firm*—Sughrue, Mion, Zinn, Macpeak & Seas, PLLC

[57] ABSTRACT

This invention provides a rotor for a dynamo-electric machine which prevents damage due to impacting during assembly to magnets arranged between claw-shaped magnetic poles to reduce magnetic flux leakage between the claw-shaped magnetic poles.

The rotor for a dynamo-electric machine according to the present invention comprises: a rotor coil which generates magnetic flux when an electric current is passed through it; a first pole core body and a second pole core body each having claw-shaped magnetic poles 23, 24, which are disposed so as to cover the rotor coil, are mutually intermeshed, and are polarized by the magnetic flux; and a magnetic body 31 wound in a zigzag so as to be disposed between each of the adjacent claw-shaped magnetic poles 23, 24, wherein the magnetic body 31 is provided with prismatic mediating portions 34 each comprising a magnet 36 polarized so as to reduce magnetic flux leakage between the claw-shaped magnetic poles 23, 24 and a cover portion 37 made of resin which covers the magnet 36, and wherein spaces S are formed between the mediating portions 34 and the claw-shaped magnetic poles 23, 24.

12 Claims, 10 Drawing Sheets

ROTOR FOR A DYNAMO-ELECTRIC MACHINE

BACKGROUND OF THE INVENTION

1. Field of the Invention

The present invention relates to a rotor for a dynamo-electric machine provided with magnetic components arranged between adjacent claw-shaped magnetic poles to reduce magnetic flux leakage between the claw-shaped magnetic poles.

2. Description of the Related Art

Figure 13:
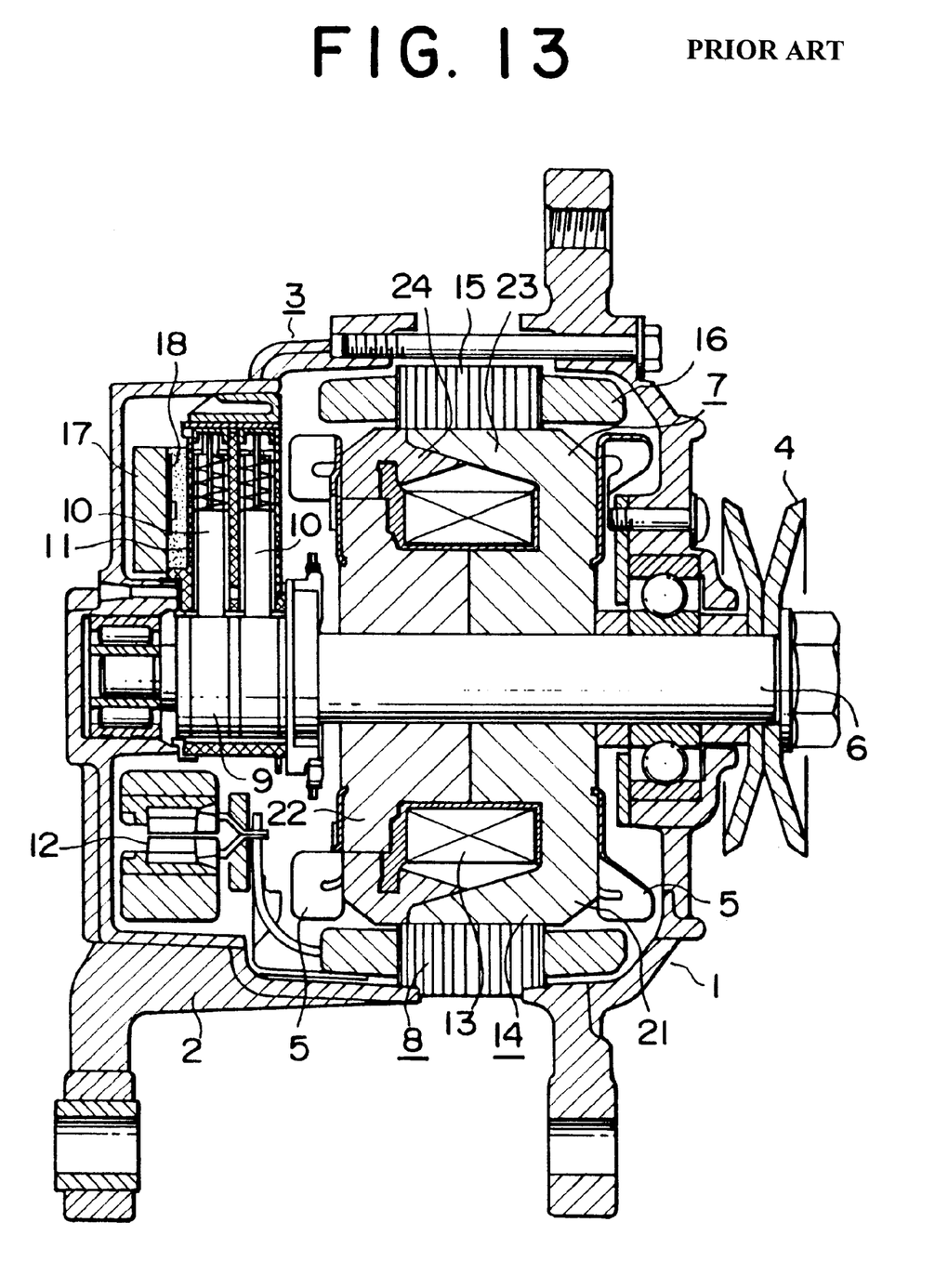
FIG. 13 is a cross-section of a conventional vehicle alternator.
Figure 14:
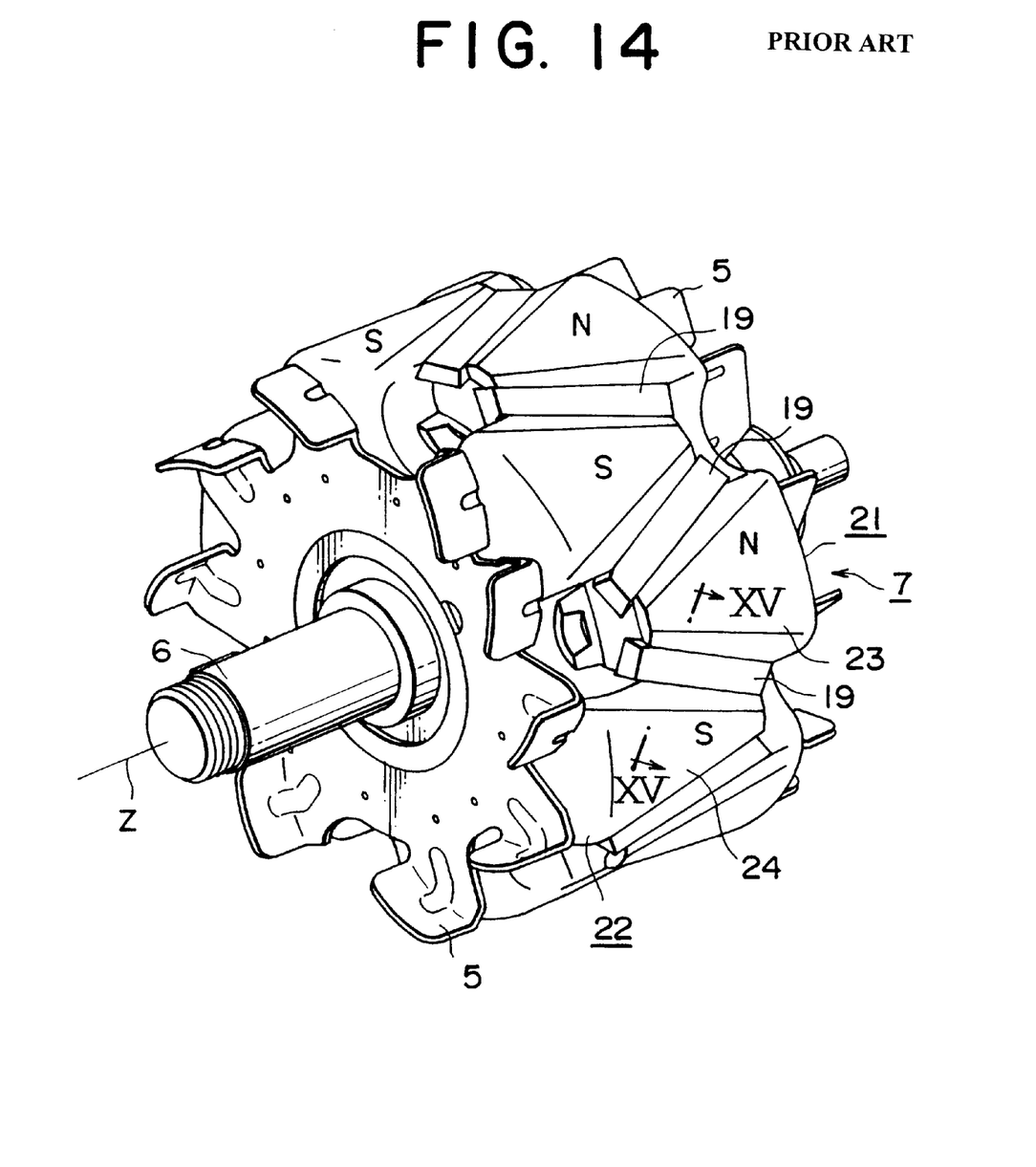
FIG. 14 is a perspective view of the rotor in FIG. 13.

FIG. 13 is a cross section of a conventional vehicle alternator which is an example of a dynamo-electric machine to which the present invention can be applied, FIG. 14 is a perspective view of the rotor in FIG. 13, and this alternator is provided with: a case 3 comprising an aluminum front bracket 1 and an aluminum rear bracket 2; a shaft 6 to which a pulley 4 is secured, disposed in the case 3; a roundel-shaped rotor 7 secured to the shaft 6; fans 5 secured to both sides of the rotor 7; a stator 8 secured to the inner wall of the case 3; slip rings 9 which supply electric current to the rotor 7, secured to the other end of the shaft 6; a pair of brushes 10 which move in contact with the slip rings 9; brush holders 11 which accommodate the brushes 10; a commutator 12 in electrical contact with the stator 8 which converts an alternating current generated in the stator 8 to a direct current; a heat sink 17 fitted into the brush holder 11; and a regulator 18 secured in contact with the heat sink 17 to regulate the magnitude of the alternating voltage generated in the stator 8.

The rotor 7 is provided with: a rotor coil 13 which generates magnetic flux when an electric current is passed through it; and a pole core 14 in which magnetic poles are formed by the magnetic flux generated by the rotor coil 13, disposed so as to cover the rotor coil 13. The pole core 14 comprises a first pole core body 21 and a second pole core body 22 which are mutually intermeshed. The first pole core body 21 and the second pole core body 22 are made of iron, and have claw-shaped magnetic poles 23, 24 respectively. Magnets 19 of trapezoidal cross-section, which are polarized so as to reduce magnetic flux leakage between the claw-shaped magnetic poles 23, 24, are secured by adhesive to adjacent claw-shaped magnetic poles 23, 24.

The stator 8 is provided with: a stator core 15; and a stator coil 16, which is a conductor wound around the stator core 15 which generates an electric current in response to changes in the magnetic flux generated by the rotor coil 13 resulting from the rotation of the rotor 7.

In a vehicle alternator of the above construction, a current is supplied by a battery (not shown) through the brushes 10 and slip rings 9 to the rotor coil 13, and a magnetic flux is generated, whereby the claw-shaped magnetic poles 23 of the first pole core body 21 are polarized with a north-seeking (N) pole, and the claw-shaped magnetic poles 24 of the second pole core body 22 are polarized with a south-seeking (S) pole. At the same time, the pulley 4 is driven by the engine and the rotor 7 is rotated by the shaft 6, so that a rotating magnetic field is imparted to the stator coil 16 and electromotive force is generated in the stator coil 16. This alternating electromotive force is converted to a direct current by means of the commutator 12 and its magnitude is regulated by the regulator 18, and the battery is recharged.

Figure 15:
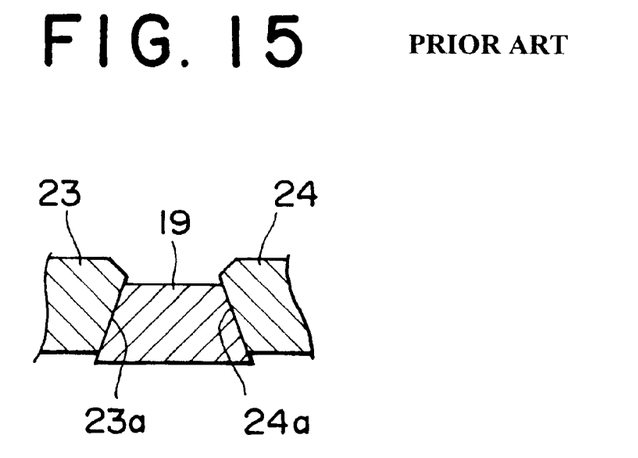
FIG. 15 is a cross section along line XV–XV in FIG. 14.
Figure 16:
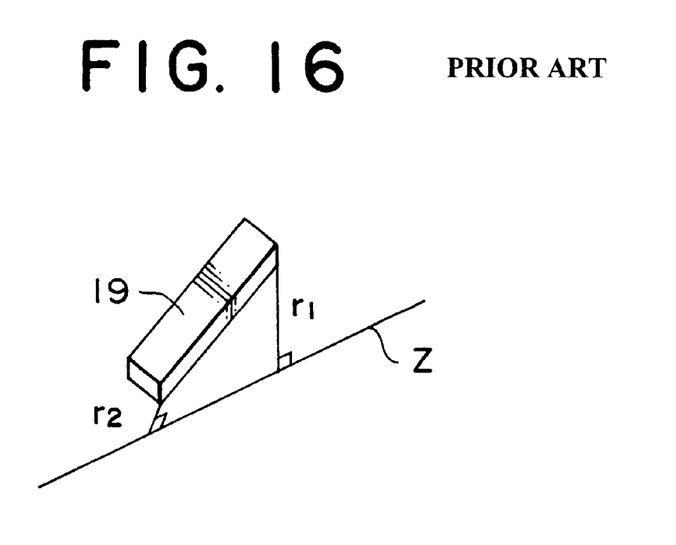
FIG. 16 is a diagram to explain that the centrifugal force acting on a magnet from FIG. 14 is nonuniform.

The rotor 7 of the conventional vehicle alternator, in which magnets 19 are secured by adhesive to the claw-shaped magnetic poles 23, 24, suffers from the following problems:

a) As the rotor 7 rotates, each of the magnets 19 is subjected to a large centrifugal force, and each is supported against this centrifugal force by tapered surfaces 23a, 24a on the claw-shaped magnetic poles 23, 24, as shown in FIG. 15, but the magnets 19 are not subjected to a uniform load, and so the magnets 19 are easily damaged. The reason that the magnets 19 are not subjected to a uniform load is that the magnets 19 are not arranged parallel to the axis Z of the rotor 7. The distance ($r_1, r_2$) from the axis Z is different for each part of the magnet 19, as shown in FIG. 16, and so the centrifugal force is different; and b) The magnets 19 are secured by means of adhesive in close contact between the claw-shaped magnetic poles 23 and claw-shaped magnetic poles 24 and a corresponding degree of milling precision is required for the claw-shaped magnetic poles 23, 24, and for that reason cutting work is required after forging the claw-shaped magnetic poles 23, 24 from raw materials, which makes the manufacturing process complicated and raises production costs. Also, because there is no space between the claw-shaped magnetic poles 23, 24 and the magnets 19, there is a risk that the delicate magnets 19 may be damaged when they are inserted between the claw-shaped magnetic poles 23 and claw-shaped magnetic poles 24.

SUMMARY OF THE INVENTION

The present invention is aimed at solving the above problems and an object of the present invention is to provide a rotor for a dynamo-electric machine in which the magnetic components are not damaged during body or by the load of centrifugal forces, and for which production costs are reduced.

The rotor for a dynamo-electric machine according to the present invention comprises: a rotor coil which generates magnetic flux when an electric current is passed through it; a first pole core body and a second pole core body each having claw-shaped magnetic poles, which are disposed so as to cover the rotor coil, are mutually intermeshed, and are polarized by the magnetic flux; and a magnetic body wound in a zigzag so as to be disposed between each of the adjacent claw-shaped magnetic poles, wherein the magnetic body is provided with prismatic mediating portions each comprising: a magnetic component polarized so as to reduce magnetic flux leakage between the claw-shaped magnetic poles; and a cover portion made of resin which covers the magnetic component, and wherein spaces are formed between the mediating portions and the claw-shaped magnetic poles.

In the rotor for a dynamo-electric machine, the magnetic body may also have a cylindrical support portion disposed inward from the claw-shaped magnetic poles which supports the mediating portions.

In the rotor for a dynamo-electric machine, the support portion may also be elastic.

In the rotor for a dynamo-electric machine, the mediating portions and the support portion may also be formed integrally by insertion molding.

In the rotor for a dynamo-electric machine, the support portion and the cover portions of the mediating portions which cover the magnetic components may also be composed of a polyamide resin.

In the rotor for a dynamo-electric machine, the longitudinal cross-section of the magnetic components may also be a shape which fits within the region where the sides of opposing claw-shaped magnetic poles overlap.

In the rotor for a dynamo-electric machine, the cross-section of the magnetic components may also be trapezoidal.

In the rotor for a dynamo-electric machine, the magnetic components may also be covered on all sides by the cover portions.

In the rotor for a dynamo-electric machine, part of the magnetic components may also be exposed and face the side of the claw-shaped magnetic poles.

In the rotor for a dynamo-electric machine, the magnetic components may also be permanent magnets.

In the rotor for a dynamo-electric machine, the magnetic components may also be plastic magnets.

In the rotor for a dynamo-electric machine, filler portions may also be disposed in the spaces to prevent the magnetic body from moving circumferentially.

DETAILED DESCRIPTION OF THE PREFERRED EMBODIMENTS

The rotor for a dynamo-electric machine according to the present invention will be explained below using a rotor for a vehicle alternator as an example. Parts identical to or corresponding to those in FIGS. 13 and 14 will be given identical numbers.

Embodiment 1

Figure 1:
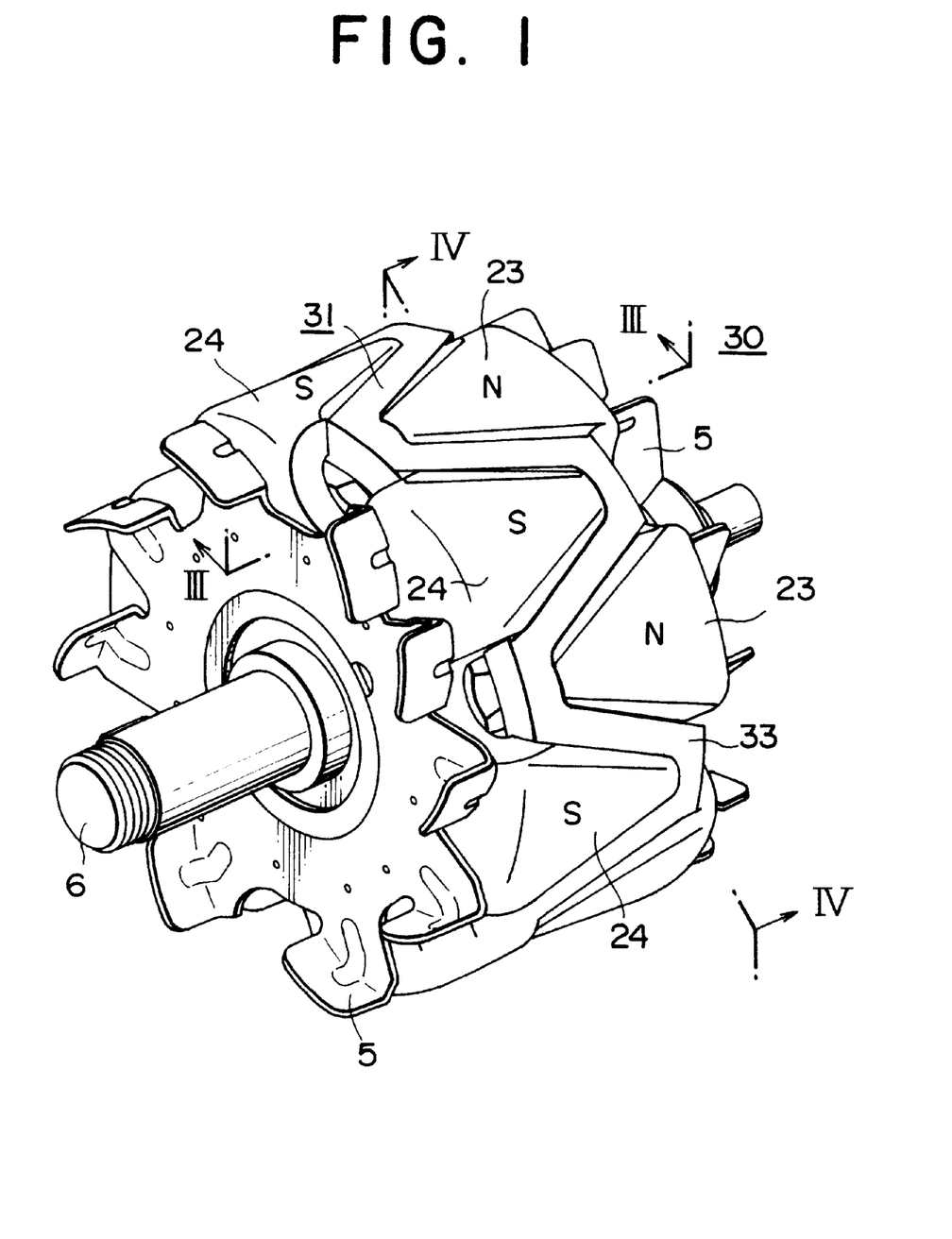
FIG. 1 is a perspective view of the rotor for a vehicle alternator according to Embodiment 1 of the present invention.
Figure 2:
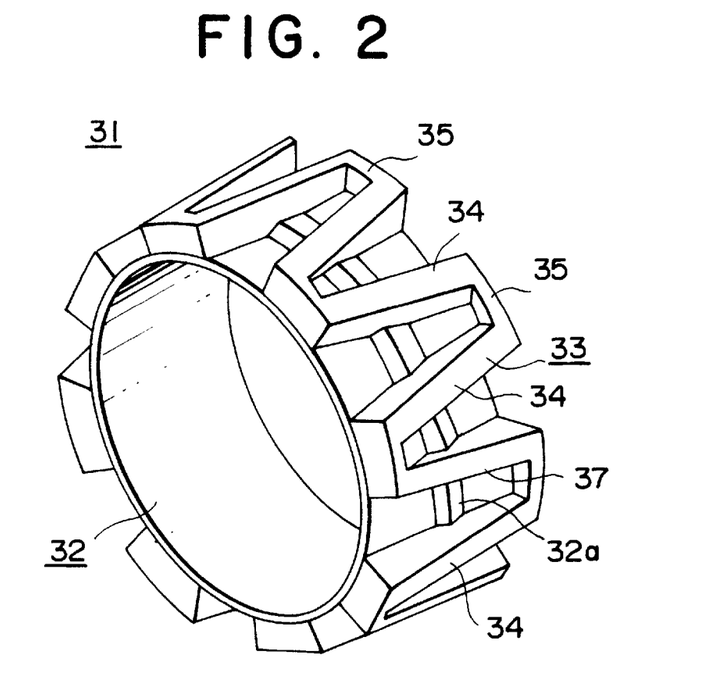
FIG. 2 is a perspective view of the magnetic body in FIG. 1.
Figure 3:
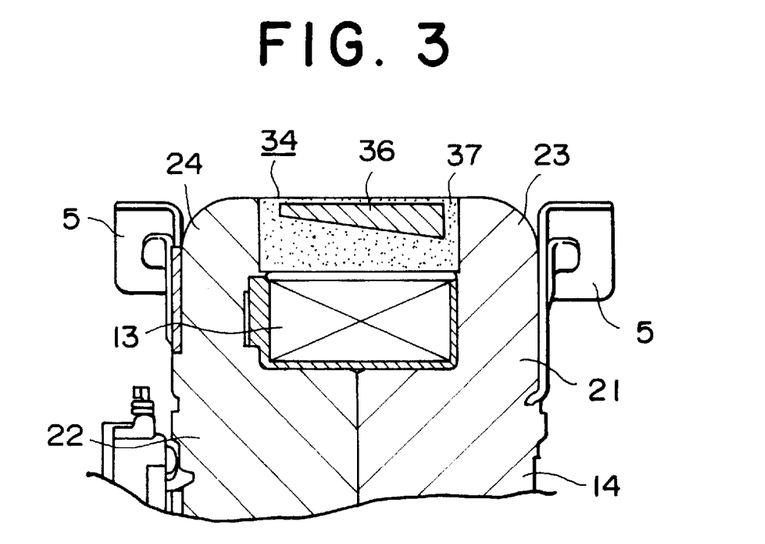
FIG. 3 is a cross section along line III–III in FIG. 1.
Figure 4:
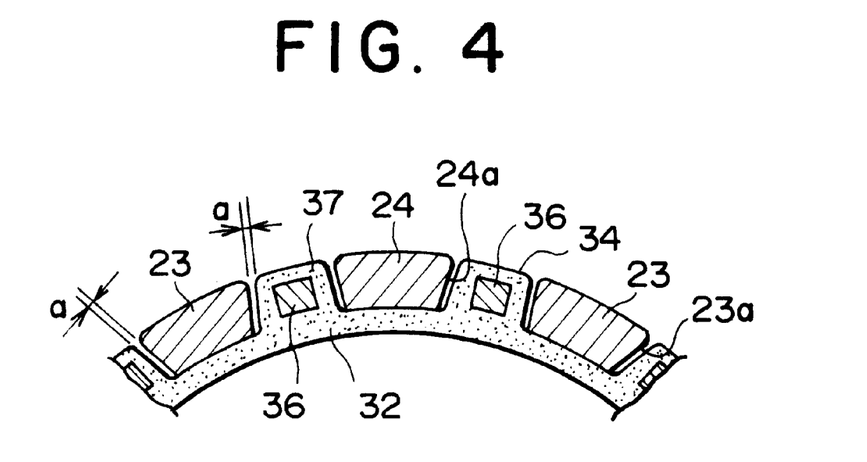
FIG. 4 is a cross section along line IV–IV in FIG. 1.
Figure 5:
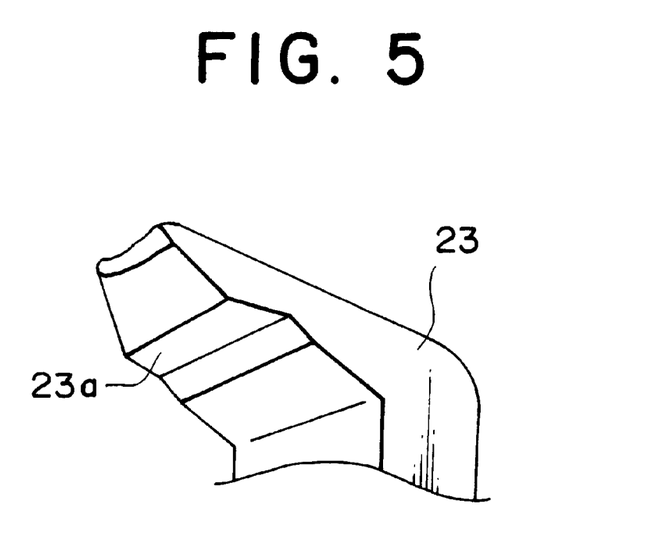
FIG. 5 is a partial perspective view of a claw-shaped magnetic pole from FIG. 1.
Figure 6:
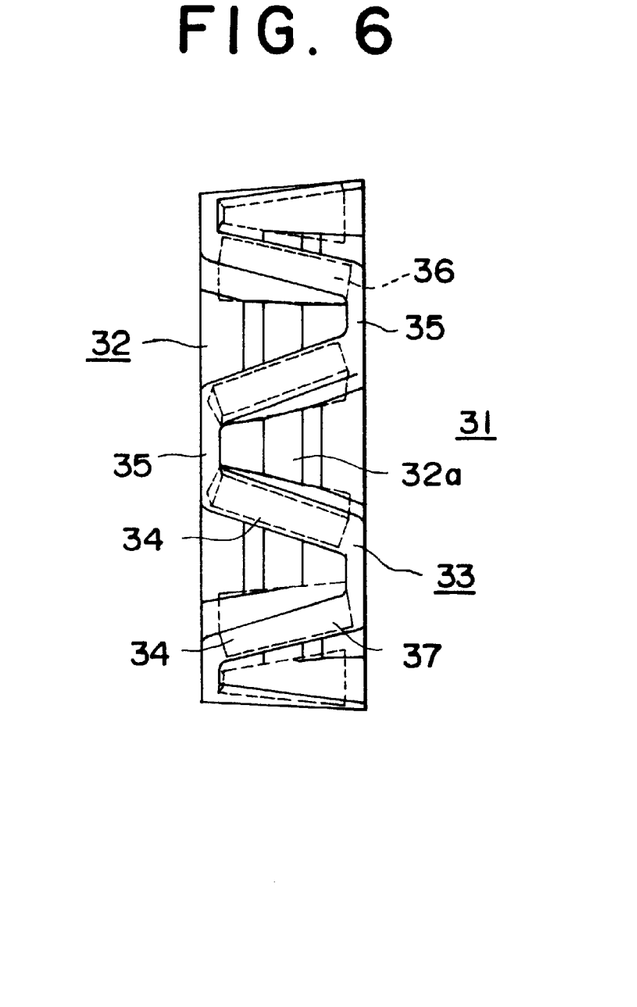
FIG. 6 is a front elevation of the magnetic body in FIG. 1.
Figure 7:
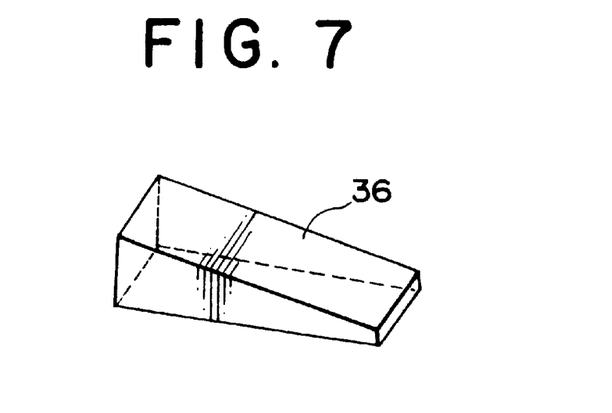
FIG. 7 is a perspective view of a magnet embedded in the magnetic body in FIG. 1.

FIG. 1 is a perspective view of the rotor for a vehicle alternator according to the present invention, FIG. 2 is a perspective view of the magnetic body in FIG. 1, FIG. 3 is a cross section along line III–III in FIG. 1, FIG. 4 is a cross section along line IV–IV in FIG. 1, FIG. 5 is a partial perspective view of a claw-shaped magnetic pole from FIG. 1, FIG. 6 is a front elevation of the magnetic body in FIG. 1, and FIG. 7 is a perspective view of a magnet embedded in the magnetic body in FIG. 1.

This alternator is provided with: a case 3 comprising an aluminum front bracket 1 and an aluminum rear bracket 2; a shaft 6 to which a pulley 4 is secured, disposed in the case 3; a roundel-shaped rotor 30 secured to the shaft 6; fans 5 secured to both sides of the rotor 30; a stator 8 secured to the inner wall of the case 3; slip rings 9 which supply electric current to the rotor 30, secured to the other end of the shaft 6; a pair of brushes 10 which move in contact with the slip rings 9; brush holders 11 which accommodate the brushes 10; a commutator 12 in electrical contact with the stator 8 which converts an alternating current generated in the stator 8 to a direct current; a heat sink 17 fitted into the brush holder 11; and a regulator 18 secured in contact with the heat sink 17 to regulate the magnitude of the alternating voltage generated in the stator 8.

The rotor 30 is provided with: a rotor coil 13 which generates magnetic flux when an electric current is passed through it; a pole core 14 in which magnetic poles are formed by the magnetic flux generated by the rotor coil 13, disposed so as to cover the rotor coil 13; and a magnetic body 31 which covers the rotor coil 13.

The pole core 14 comprises a first pole core body 21 and a second pole core body 22 which are mutually intermeshed. The first pole core body 21 and the second pole core body 22 are made of iron, and have claw-shaped magnetic poles 23, 24 respectively.

The magnetic body 31 is provided with: a radially-displaceable, elastic, cylindrical support portion 32 which has step portions 32a which come into contact with step portions 23a formed on the underside of the claw-shaped magnetic poles 23; and a magnetic portion 33 wound in a zigzag on the support portion 32. The magnetic portion 33 is provided with: prismatic mediating portions 34 disposed between adjacent claw-shaped magnetic poles 23, 24; and connecting portions 35 which connect the mediating portions to each other. Each of the mediating portions 34 comprises: a magnet 36, as shown in FIG. 7; and a cover portion 37 which covers the magnet 36. Each of the magnets 36 in the cover portions 37 is arrange such that the north-seeking (N) face of the magnet 36 faces the claw-shaped magnetic pole 23 which is polarized with a north-seeking (N) pole, and the south-seeking (S) face of the magnet 36 faces the claw-shaped magnetic pole 24 which is polarized with a south-seeking (S) pole. Spaces S are formed between each of the mediating portions 34 and the adjacent claw-shaped magnetic poles 23, 24.

The support portion 32 and magnetic portion 33 of the magnetic body 31 are formed integrally by insertion molding, in which magnets 36 are arranged in a metal mold and polyamide resin is injected into the metal mold.

A stator 8 is provided with: a stator core 15; and a stator coil 16, which is a conductor wound around the stator core 15 which generates an electric current in response to changes in the magnetic flux generated by the rotor coil 13 resulting from the rotation of the rotor 30.

The rotor 30 for a vehicle alternator of the above construction can be assembled with the rotor coil 13 already encased in the support portion 32 by pressing the claw-shaped magnetic poles 23, 24 together from either side of the magnetic body 31 so as to sandwich the zigzagged magnetic portion 33. Spaces S are formed between the claw-shaped magnetic poles 23, 24 and the mediating portions 34, so that damage to the magnets 36, such as that caused by the claw-shaped magnetic poles 23, 24 impacting the mediating portions 34 when they are pressed together, is prevented.

In a vehicle alternator of the above construction, a current is supplied by a battery (not shown) through the brushes 10 and slip rings 9 to the rotor coil 13 and a magnetic flux is generated, whereby the claw-shaped magnetic poles 23 of the first pole core body 21 are polarized with a north-seeking (N) pole, and the claw-shaped magnetic poles 24 of the second pole core body 22 are polarized with a south-seeking (S) pole. At the same time, the pulley 4 is driven by the engine and the rotor 30 is rotated by the shaft 6, so that a rotating magnetic field is imparted to the stator coil 16 and electromotive force is generated in the stator coil 16. This alternating electromotive force is converted to a direct current by means of the commutator 12 and its magnitude is regulated by the regulator 18, and the battery is recharged.

As the rotor 30 rotates, centrifugal force acts on the magnets 36 as well as the claw-shaped magnetic poles 23, 24, but the magnets are supported against this load especially by the cylindrical support portion 32 and the magnets 36 are not subjected to a load, so that the magnets 36 are not damaged or otherwise affected by the centrifugal force.

Also, the support portion 32 of the magnetic body 31 is minutely displaced in a radially inward direction as a result of the support portion 32 of the magnetic body 31 being pushed inwards by the claw-shaped magnetic poles 23, 24 at the time of assembly of the rotor 30, but any residual stress occurring in the support portion 32 of the magnetic body 31 at the time of assembly is reduced as a result of the displacement of the support portion 32 in a radially outward direction by centrifugal force when the rotor 30 is rotating.

Furthermore, the magnetic body 31 according to the above Embodiment 1 is provided with a support portion 32, but the magnetic body may also consist solely of a zigzagged, elastic, magnetic portion provided with spaces between the mediating portions of the magnetic portion and the claw-shaped magnetic poles.

Embodiment 2

Figure 8:
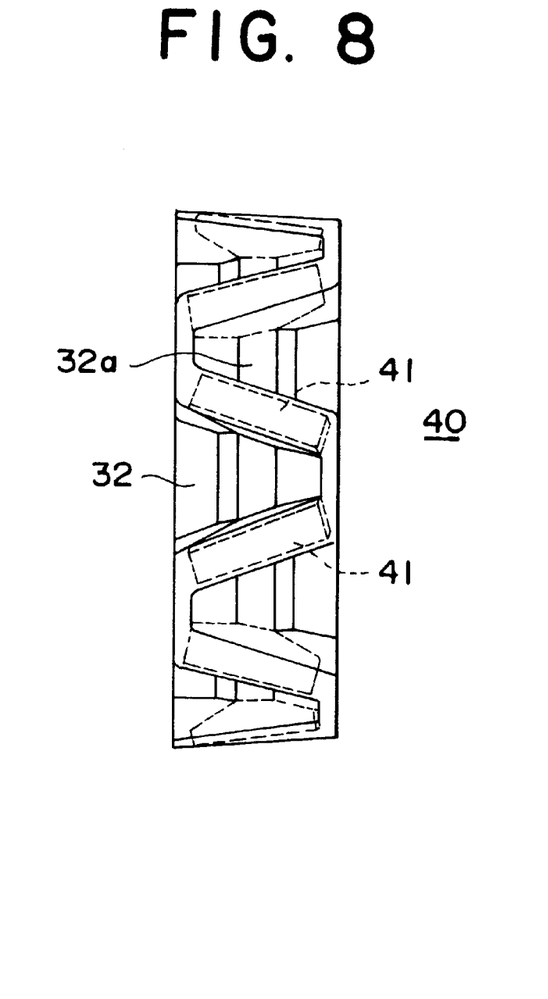
FIG. 8 is a front elevation of the magnetic body of the rotor for a vehicle alternator according to Embodiment 2 of the present invention.

FIG. 8 is a front elevation of the magnetic body of the rotor for a vehicle alternator according to Embodiment 2 of the present invention, in which the shape of the magnets is different from that of the rotor 30 in Embodiment 1.

Figure 9:
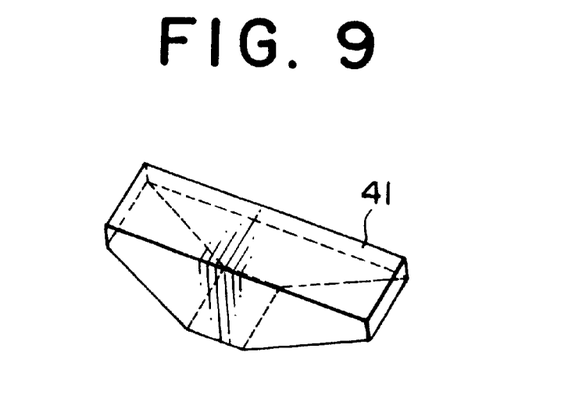
FIG. 9 is a perspective view of a magnet embedded in the magnetic body in FIG. 8.

Whereas the magnets 36 in Embodiment 1 are wedge-shaped on the whole, the magnets 41 in this magnetic body 40 are trapezoidal in longitudinal cross-section, as shown in FIG. 9.

The amount of magnetic flux leakage between the claw-shaped magnetic poles 23, 24 is determined by the region where the sides 23a, 24a of adjacent claw-shaped magnetic poles 23, 24 overlap, and when the length of the cross-section of the magnet 36 exceeds that region, the portion of the magnet 36 which exceeds that region has little effect in reducing magnetic flux leakage between the claw-shaped magnetic poles 23, 24.

The magnets 41 in the magnetic body 40 in Embodiment 2 have a shape which fits within the region where the sides 23a, 24a of opposing claw-shaped magnetic poles 23, 24 overlap, namely a trapezoidal shape, and the use of expensive magnets 41 is kept to a minimum.

Figure 10:
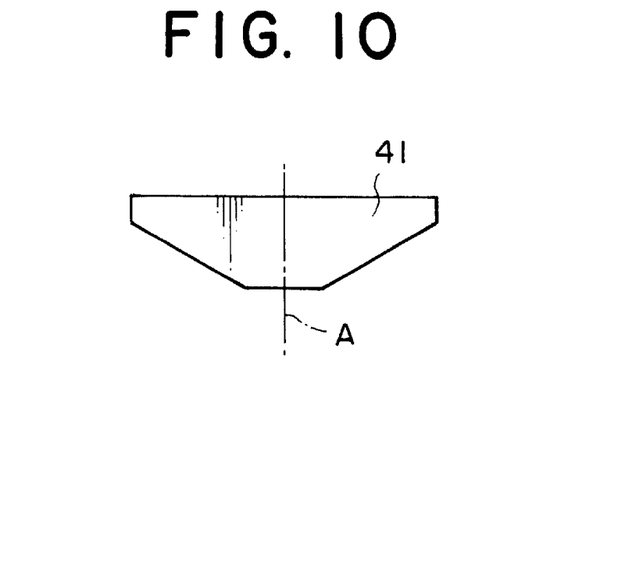
FIG. 10 is a front elevation of the magnet in FIG. 9.

Also, the shape of the magnets 41 is symmetrical about the central axis A, as shown in FIG. 10, so that when, for example, a magnetic body 40 is formed by insertion molding in which the magnets 41 are arranged in a metal mold, the degree of freedom of arrangement is greater, and the manufacturing operation for the magnetic body 40 is improved.

Embodiment 3

Figure 11:
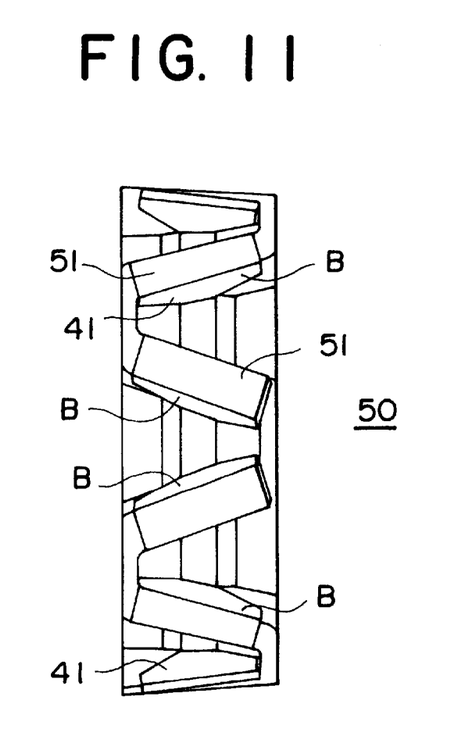
FIG. 11 is a front elevation of the magnetic body of the rotor for a vehicle alternator according to Embodiment 3 of the present invention.

FIG. 11 is a front elevation of the magnetic body 50 of the rotor for a vehicle alternator according to Embodiment 3 of the present invention.

The sides B of the mediating portions 51, which are the sides facing the sides 23a, 24a of the claw-shaped magnetic poles 23, 24, differ from those of Embodiment 2 in that the magnets 41 are exposed.

In this rotor, there is no cover portion between the sides 23a, 24a of the claw-shaped magnetic poles 23, 24 and the mediating portions 51, so that magnetic resistance between the claw-shaped magnetic poles 23, 24 and the magnets 41 is reduced, the capacity of the magnets 41 to reduce magnetic flux leakage increases, and generating efficiency improves.

Embodiment 4

Figure 12:
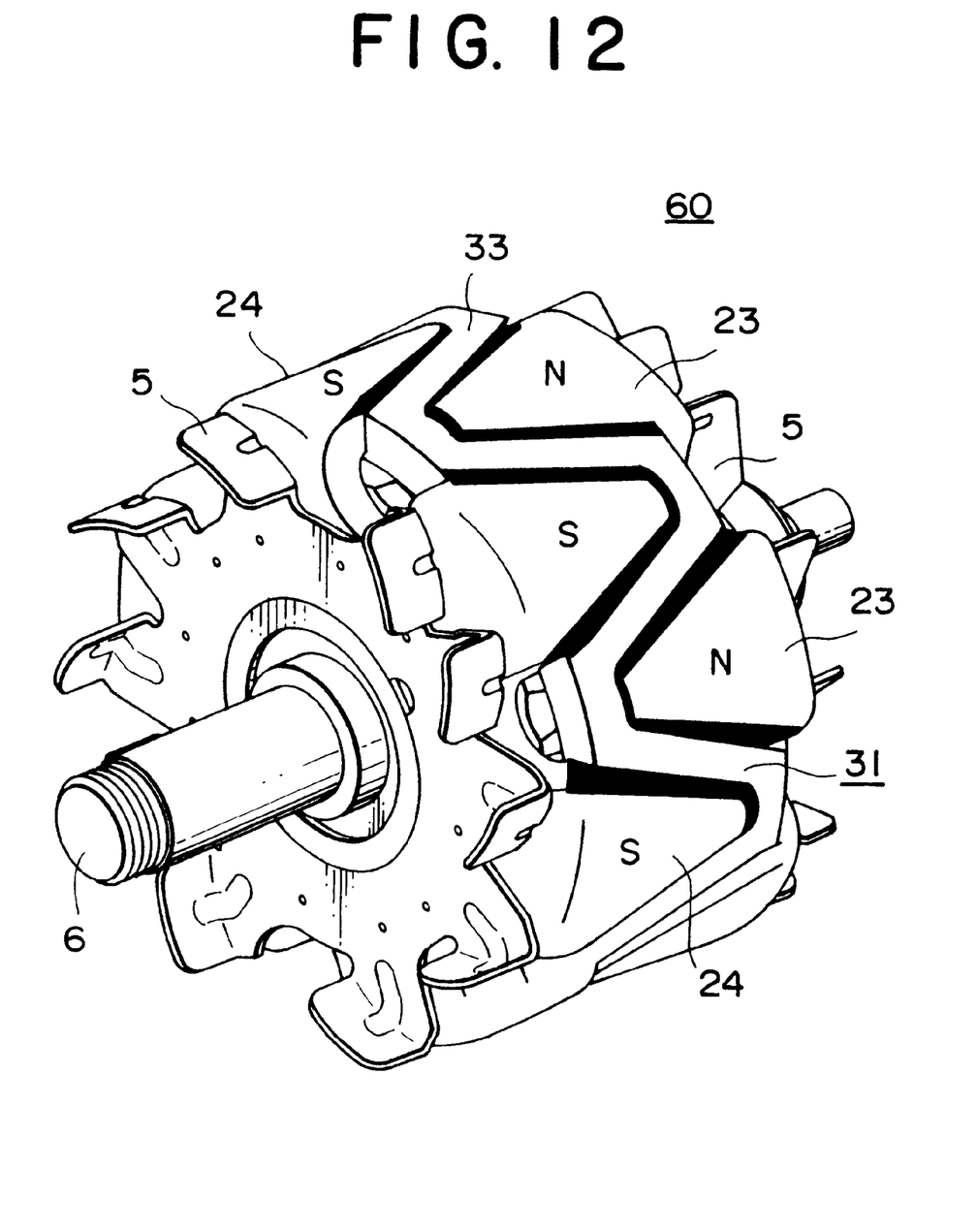
FIG. 12 is a perspective view of the rotor for a vehicle alternator according to Embodiment 4 of the present invention.

FIG. 12 is a perspective view of the rotor 60 for a vehicle alternator according to Embodiment 4 of the present invention.

The rotor 60 is the same as rotor 30 in Embodiment 1 except that filler portions 61 have been additionally disposed in the spaces S of rotor 30 of Embodiment 1 to prevent the magnetic body 31 from moving circumferentially.

The filler portions are formed by assembling the rotor 60 by pressing the claw-shaped magnetic poles 23, 24 together from either side of the magnetic body 31 so as to sandwich the zigzagged magnetic portion 33, then injecting an epoxy adhesive resin into the spaces S and hardening the resin.

Tape comprising carbon fibers impregnated with epoxy resin may also be used for the filler portions 61.

Furthermore, magnets 36, 41 have been used as the magnetic components in each of the above embodiments, but plastic magnets may also be used, and the magnetic component portions may be injection molded first and the whole assembly injection molded thereafter.

Also, in the above embodiments, an explanation has been given using a rotor for a vehicle alternator as an example of a rotor for a dynamo-electric machine, but this rotor can naturally be applied to other rotors, such as a rotor for an electric motor.

As explained above, the rotor for a dynamo-electric machine according to the present invention comprises: a rotor coil which generates magnetic flux when an electric current is passed through it; a first pole core body and a second pole core body each having claw-shaped magnetic poles, which are disposed so as to cover the rotor coil, are mutually intermeshed, and are polarized by the magnetic flux; and a magnetic body wound in a zigzag so as to be disposed between each of the adjacent claw-shaped magnetic poles, wherein the magnetic body is provided with prismatic mediating portions each comprising: a magnetic component polarized so as to reduce magnetic flux leakage between the claw-shaped magnetic poles; and a cover portion made of resin which covers the magnetic component, and wherein spaces are formed between the mediating portions and the claw-shaped magnetic poles. Therefore, the rotor for a dynamo-electric machine prevents the claw-shaped magnetic poles from impacting and damaging the mediating portions while the claw-shaped magnetic poles are being fitted from both sides of the magnetic body. Also, the dimensional precision of the claw-shaped magnetic poles in the circumferential direction does not have to be high, so that the claw-shaped magnetic poles can be formed that much more easily. Also, the magnetic components are disposed in a zigzag-wound magnetic body between the claw-shaped magnetic poles, so that the entire magnetic body supports the magnetic components against the load of the centrifugal force and damage to the magnetic components due to centrifugal force is prevented.

The magnetic body may also have a cylindrical support portion disposed inward from the claw-shaped magnetic poles which supports the mediating portions. Therefore, the rotor for a dynamo-electric machine also significantly strengthens the magnetic body against centrifugal force.

The support portion may also be elastic. Therefore, the rotor for a dynamo-electric machine also absorbs manufacturing errors which occur between the dimensions of the magnetic body and claw-shaped magnetic poles and enables the claw-shaped magnetic poles to be fitted from both sides of the magnetic body.

The mediating portions and the support portion may also be formed integrally by insertion molding. Therefore, the rotor for a dynamo-electric machine also enables the mediating portions and the support portion to be easily integrated.

The support portion and the cover portions of the mediating portions which cover the magnetic components may also be composed of a polyamide resin. Therefore, the rotor for a dynamo-electric machine also enables the support portion and cover portions with superior elasticity and insulation to be obtained at low cost.

The longitudinal cross-section of the magnetic components may also be a shape which fits the region where the sides of opposing claw-shaped magnetic poles overlap. Therefore, the rotor for a dynamo-electric machine also uses the minimum magnetic components required to prevent magnetic flux leakage between the claw-shaped magnetic poles, and thus enables a reduction in the amount of expensive magnetic component material used.

The cross-section of the magnetic components may also be trapezoidal. Therefore, as the magnetic components are symmetrical about the central axis, the degree of freedom of arrangement of the magnetic components is also increased when, for example, a magnetic body is formed by insertion molding in which the magnetic components are arranged in a metal mold, and the manufacturing operation for the magnetic body is improved.

The magnetic components may also be covered on all sides by the cover portions. Therefore, the rotor for a dynamo-electric machine also protects the magnetic components from damage due to shocks to the magnetic body.

Part of the magnetic components may also be exposed and face the side of the claw-shaped magnetic poles. Therefore, magnetic resistance between the claw-shaped magnetic poles and the magnetic components is also reduced and the capacity of the magnetic components to reduce magnetic flux leakage is increased.

The magnetic components may also be permanent magnets. Therefore the rotor for a dynamo-electric machine also enables magnetic components which prevent leakage of magnetic flux between claw-shaped magnetic poles to be obtained by a simple process.

The magnetic components may also be plastic magnets. Therefore, the rotor for a dynamo-electric machine also enables magnetic components which prevent leakage of magnetic flux between claw-shaped magnetic poles to be obtained simply and at low cost by injection molding the magnetic component portions first and injection molding the whole assembly thereafter.

Filler portions may also be disposed in the spaces to prevent the magnetic body from moving circumferentially. Therefore, the rotor for a dynamo-electric machine also prevents the magnetic body from moving circumferentially.

What is claimed is:

1. A rotor for a dynamo-electric machine comprising:

a rotor coil which generates magnetic flux when an electric current is passed through it;

a first pole core body and a second pole core body each having claw-shaped magnetic poles, which are disposed so as to cover said rotor coil, are mutually intermeshed, and are polarized by said magnetic flux;

and a magnetic body wound in a zigzag so as to be disposed between each of said adjacent claw-shaped magnetic poles, wherein said magnetic body is provided with prismatic mediating portions each comprising:

a magnetic component polarized so as to reduce magnetic flux leakage between said claw-shaped magnetic poles;

and a cover portion made of resin which covers said magnetic component, and wherein spaces are formed between said mediating portions and said claw-shaped magnetic poles.

2. The rotor for a dynamo-electric machine according to claim 1 wherein said magnetic body has a cylindrical support portion disposed inward from said claw-shaped magnetic poles which supports said mediating portions.

3. The rotor for a dynamo-electric machine according to claim 2 wherein said support portion is elastic.

4. The rotor for a dynamo-electric machine according to claim 2 wherein said mediating portions and said support portion are formed integrally by insertion molding.

5. The rotor for a dynamo-electric machine according to claim 2 wherein said support portion and said cover portions of said mediating portions which cover said magnetic components are composed of a polyamide resin.

6. The rotor for a dynamo-electric machine according to claim 1 wherein the longitudinal cross-section of said magnetic components is a shape which fits within the region where the sides of opposing claw-shaped magnetic poles overlap.

7. The rotor for a dynamo-electric machine according to claim 6 wherein the cross-section of said magnetic components is trapezoidal.

8. The rotor for a dynamo-electric machine according to claim 1 wherein said magnetic components are covered on all sides by said cover portions.

9. The rotor for a dynamo-electric machine according to claim 1 wherein part of said magnetic components is exposed and faces the side of said claw-shaped magnetic poles.

10. The rotor for a dynamo-electric machine according to claim 1 wherein said magnetic components are permanent magnets.

11. The rotor for a dynamo-electric machine according to claim 1 wherein said magnetic components are plastic magnets.

12. The rotor for a dynamo-electric machine according to claim 1 wherein filler portions are disposed in said spaces to prevent said magnetic body from moving circumferentially.

* * * * *